(12) United States Patent
Seacat et al.

(10) Patent No.: US 7,865,300 B2
(45) Date of Patent: Jan. 4, 2011

(54) SYSTEM AND METHOD FOR PROVIDING TURN-BY-TURN DIRECTIONS TO A MOVING WAYPOINT

(75) Inventors: Lisa Anne Seacat, San Francisco, CA (US); Larissa Nicole Wojciechowski, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 11/560,179

(22) Filed: Nov. 15, 2006

(65) Prior Publication Data

US 2008/0114528 A1     May 15, 2008

(51) Int. Cl.
*G08G 1/00* (2006.01)
(52) U.S. Cl. ........... 701/207; 180/167
(58) Field of Classification Search ........ 701/207, 701/36, 96, 301, 302; 340/435, 436; 180/167–170; 349/148
See application file for complete search history.

(56) References Cited

U.S. PATENT DOCUMENTS

| | | | |
|---|---|---|---|
| 6,268,804 B1 * | 7/2001 | Janky et al. | 340/903 |
| 6,516,273 B1 * | 2/2003 | Pierowicz et al. | 701/301 |
| 6,624,782 B2 * | 9/2003 | Jocoy et al. | 342/70 |
| 6,813,561 B2 | 11/2004 | MacNeille et al. | 701/213 |
| 2001/0035840 A1 | 11/2001 | Fenton et al. | 342/357.03 |
| 2003/0060973 A1 * | 3/2003 | Mathews et al. | 701/209 |
| 2004/0193372 A1 | 9/2004 | MacNeille et al. | 701/213 |
| 2005/0210131 A1 | 9/2005 | Motoyama et al. | 709/224 |
| 2006/0106537 A1 | 5/2006 | Hamrick et al. | 701/213 |

* cited by examiner

*Primary Examiner*—Dalena Tran
(74) *Attorney, Agent, or Firm*—Kunzler Needham Massey & Thorpe

(57) ABSTRACT

A system and method are disclosed for providing turn-by-turn directions to a moving waypoint where the present position of the moving waypoint is known and its future movement is constrained by a road network. The most likely future route of the moving waypoint is predicted, a rendezvous point is determined, an intercept route through the road network is computed and turn-by-turn direction to follow this intercept route are generated.

11 Claims, 5 Drawing Sheets

SYSTEM AND METHOD FOR PROVIDING TURN-BY-TURN DIRECTIONS TO A MOVING WAYPOINT

BACKGROUND OF THE INVENTION

1. Field of the Invention

The present invention relates to vehicle navigation and more particularly relates to a method for generating turn-by-turn directions to a moving waypoint based on constraints from transportation network that may be reflected in a map database.

2. Description of the Related Art

Present vehicle navigation systems typically can provide a driver turn-by-turn directions to a fixed point on a map, such as a sports stadium or airport. There are also systems that report the positions of moving vehicles, such as a fleet of delivery trucks to a central control station. One example system describes a computer-implemented method for tracking and mapping a position of mobile object using a global positioning system (GPS) receiver.

In an unrelated field of aircraft navigation, flight management systems allow an aircraft to intercept a moving waypoint, such as an aircraft rendezvousing with an aerial refueling tanker. Although these systems teach the exchange of position data between vehicles, they are not suitable for intercepting ground vehicles whose movement is constrained by a local road network. Another system teaches some exchange of position-type information between ground vehicles, but again fails to address the constraints imposed by the local road network.

To solve the aforementioned problems associated with rendezvousing with a moving waypoint within a constrained road network, the present invention provides a unique method that includes predicting the most probable path of the moving waypoint in order to compute a rendezvous point to which turn-by-turn directions can be generated and provided to a vehicle tracking the moving waypoint.

SUMMARY OF THE INVENTION

From the foregoing discussion, it should be apparent that a need exists for a system and method for providing turn-by-turn directions to the operator of a tracking vehicle to allow this operator to drive the tracking vehicle along an intercept path to a computed rendezvous point. Beneficially, such a system and method would consider that both the tracking vehicle and the moving waypoint are both movement constrained by the local road network through which they are traveling.

The present invention has been developed in response to the present state of the art, and in particular, in response to the problems and needs in the art that have not yet been fully solved by currently available vehicle navigation systems. Accordingly, the present invention has been developed to provide a system and method for providing turn-by-turn directions to a moving waypoint that overcomes many or all of the above-discussed shortcomings in the art.

The system and method of the present invention configured to providing turn-by-turn directions to a moving waypoint includes a plurality of modules configured to functionally execute the necessary steps of receiving the position of the moving waypoint, predicting the most likely future route of the moving waypoint, determining a rendezvous point, computing an intercept route, and generating turn-by-turn directions. The turn-by-turn directions may be provided to an operator of a vehicle following the moving waypoint. These functional units are described as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices.

The present invention, in one embodiment, is configured as a system comprising a first position determining system for determining the present geographic position of the moving waypoint and a transmitter configured to transmit this present geographic position to a tracking vehicle that includes a second position determining system for determining the present geographic position of the tracking vehicle and a receiver configured to receive the present geographic position of the moving waypoint. The future movement of both the moving waypoint and the tracking vehicle are constrained by a local road network. Therefore, the tracking vehicle further includes a map database containing the defined movement constraints of the local road network, a position predicting module that applies the local road network movement constraints to present geographic position of the moving waypoint to generate a most likely next future position of the moving waypoint, and a turn-by-turn direction generating module which generates turn-by-turn directions from the present position of the tracking vehicle to the most likely next future position of the moving waypoint.

An illustrative method of the present invention is also presented. This method provides turn-by-turn directions to a moving waypoint that is movement constrained by a local road network by first receiving a transmitted present position of the moving waypoint at a tracking vehicle. The method then predicts the most likely future route of the moving waypoint, based on its present position and movement constraints imposed by a local road network. Next, a rendezvous point is determined and an intercept route is computed between the tracking vehicle and the moving waypoint, where the rendezvous point and intercept route are based on the most likely future route of the moving waypoint, the present position of the tracking vehicle, and the constraints of the local road network. Finally, turn-by-turn directions are generated at the tracking vehicle to follow the intercept route to the rendezvous point.

An additional illustrative method of the present invention is also presented. This method for rendezvousing a first moving vehicle with a second moving vehicle where both vehicles constrained by a local road network comprises first of determining the geographic position and speed of the first moving vehicle and receiving a transmitted present geographic position and speed of the second moving vehicle. Next, the most likely future route of the second moving vehicle is determined and the second vehicle's most likely future speed profile along that route is also determined, based on its present position and present speed and the constraints of the local road network. Next, the method computes an intercept route, intercept speed plan, and rendezvous point based on the most likely future route and most likely future speed profile of the second moving vehicle, the geographic position, and speed of first vehicle, and the constraints of the local road network. Finally the method generates turn-by-turn directions and instructions on changing speeds to follow the intercept route to the rendezvous point.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

The described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
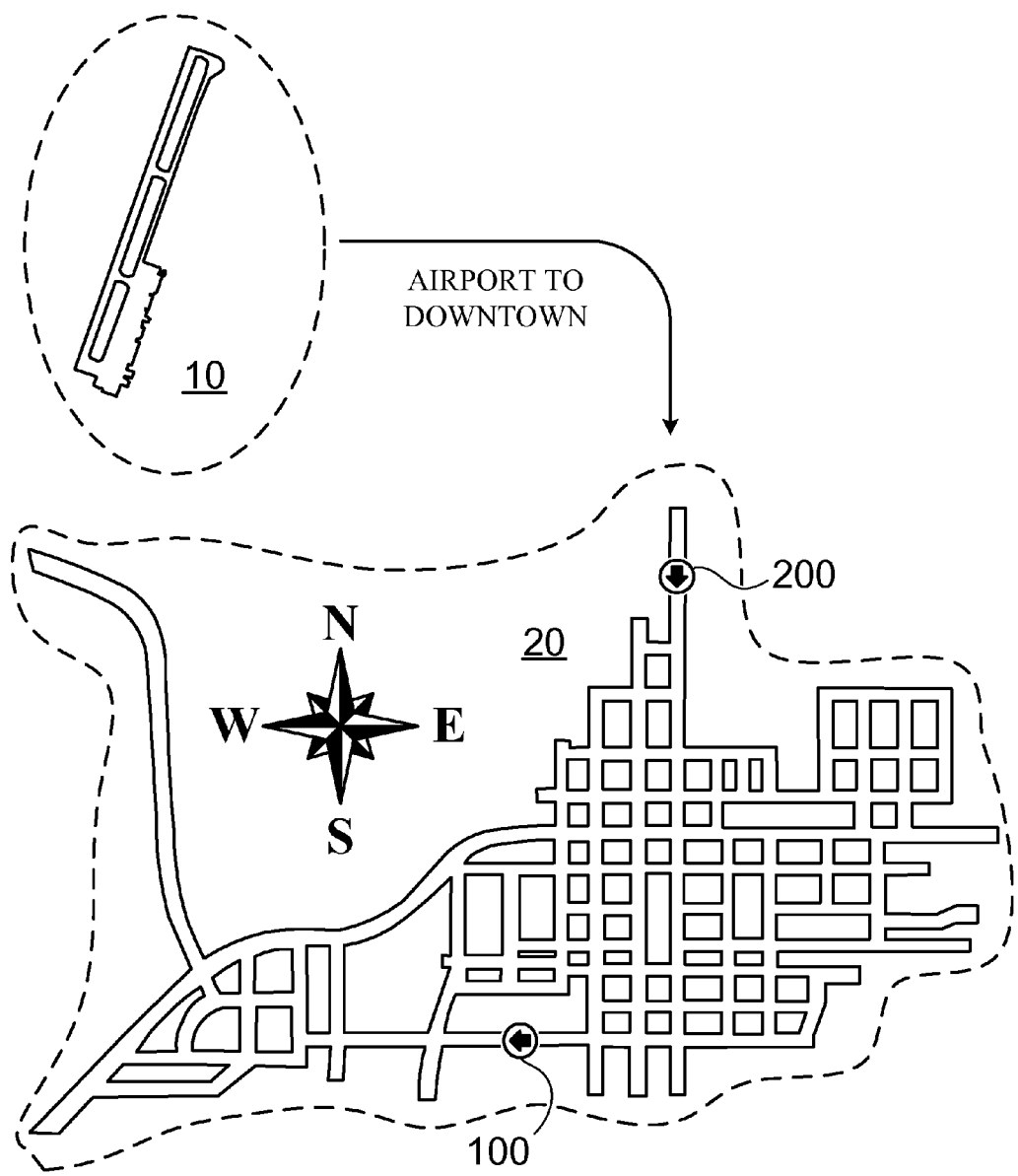
FIG. 1 is a general representation of a map that shows a local road network and provides context for discussion of the present invention.

Refer now to FIG. 1, which illustrates a small city airport 10 and downtown area 20. The down town area includes a local road network 20 comprising a street grid. Those skilled in the art will recognize that there are other types of road networks, including for example, the U.S Interstate highway system.

A first vehicle 100 is shown traveling west on one of the streets within the street grid local road network 20. A second vehicle 200, which desires to track and rendezvous with the first vehicle 100 is shown entering the street grid local road network 20 from the north, perhaps traveling downtown after having arrived at the airport 10.

Figure 2:
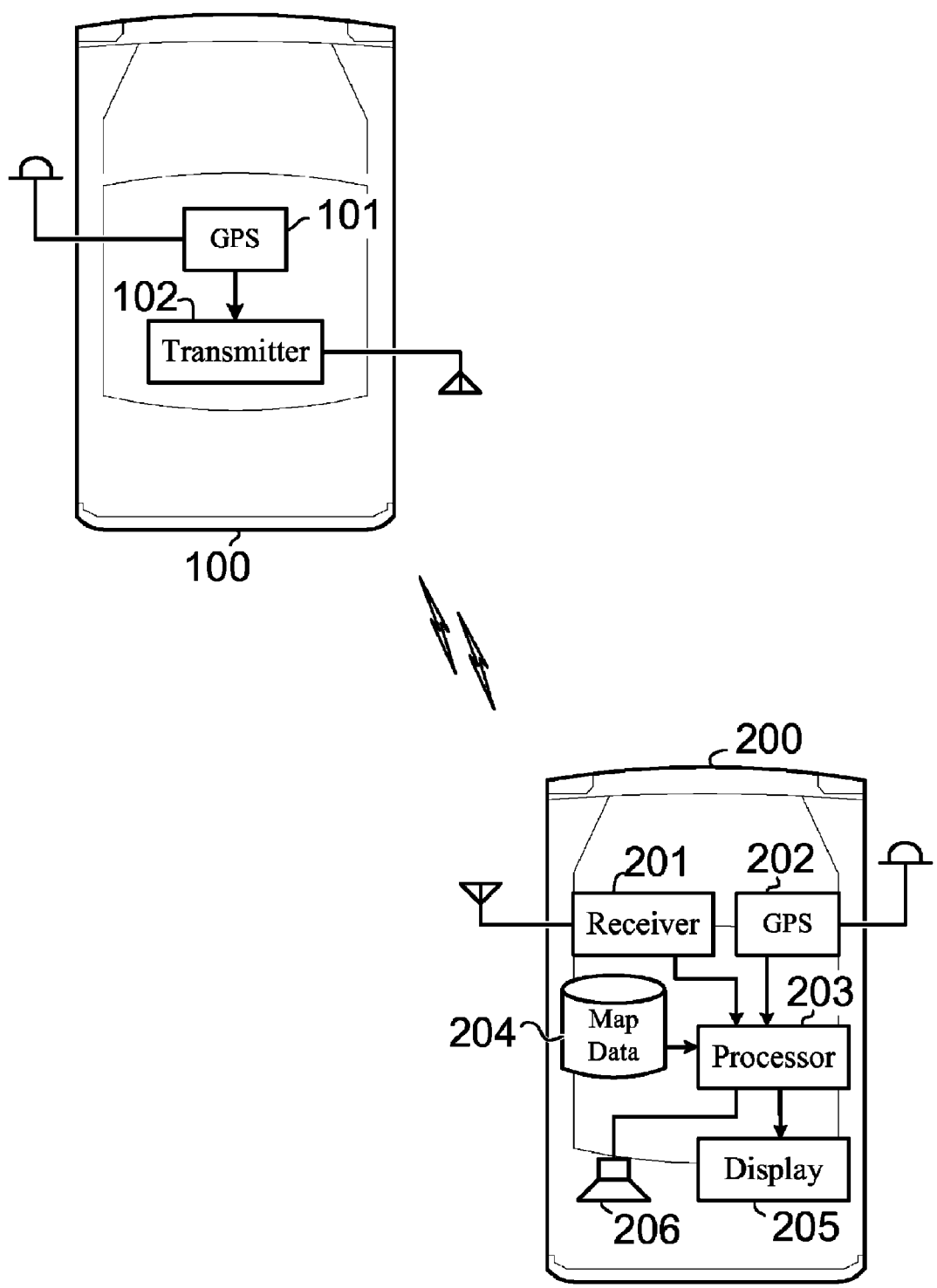
FIG. 2 depicts one embodiment of a system for providing turn-by-turn directions in accordance with the present invention.
Figure 3:
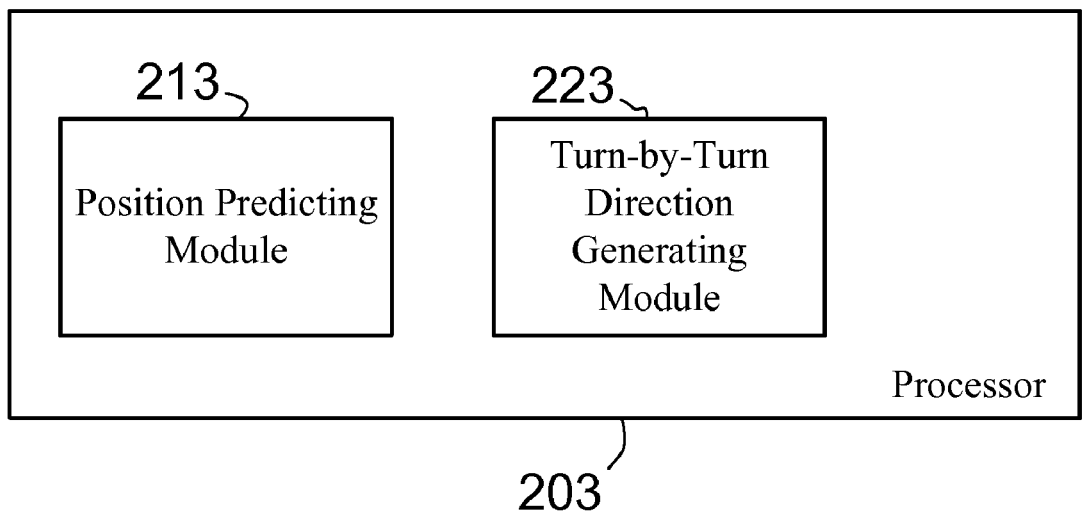
FIG. 3 shows further details of the processor element depicted in FIG. 2.

Now refer to FIGS. 2 and 3 while continuing to refer to FIG. 1. According to the present invention, the first vehicle 100 includes a position determining system 101, such as a global positioning system (GPS) receiver, for determining the present geographic position of the first vehicle 100. The first vehicle 100 also includes a transmitter 102 adapted to transmit its present geographic position data to a suitably equipped receiver 201. It will be appreciated by those skilled in the art that such a data transmission may be sent directly to the receiver 201 or may be relayed through a central system or a series of relay stations. It will also be appreciated by those skilled in the art that such a data transmission can be kept secure when the transmitter and receiver have a shared digital code which may or may not include encryption.

The second vehicle 200, which desires to track the first vehicle 100, includes a receiver 201 adapted to receive the geographic position data signal from the first vehicle 100. Those skilled in the art will recognize that, for navigation display purposes, the moving first vehicle could be described in a more general sense as a "moving waypoint" and that the second vehicle could be described as a "tracking vehicle". It will be further recognized by those skilled in the art that the transmission of position data from the moving waypoint to the tracking can be accomplished by any suitable means both direct and indirect, such as by a first transmission from the moving waypoint to a network system followed by a subsequent transmission from the network system to the tracking vehicle.

The tracking second vehicle 200 is locally equipped with its own position determining system 202, such as a second GPS receiver. The position determining system 201 is connected to a local processor 203 which is in communication with map database 204 and is adapted to calculate turn-by-turn directions from the current geographic position of the tracking second vehicle 200 to a stationary waypoint contained within the local road network 20. Alternatively, the local processor 203 is adapted to calculate turn-by-turn directions from the current geographic position of the tracking second vehicle 200 to a moving waypoint contained within the local road network 20.

The processor 203 includes a position predicting module 213 that receives the geographic position of a moving waypoint, such as for example, the first vehicle 100, which is currently being tracked. The position predicting module 213 determines a number of possible future positions of the moving waypoint first vehicle 100, based on the constraints of the local road network 20, such as dead-end or one-way streets, posted speed limits. In one embodiment, the position predicting module 213 incorporates real-time constraint information such as weather information, traffic accident or slow down information, construction information and the like.

Figure 4:
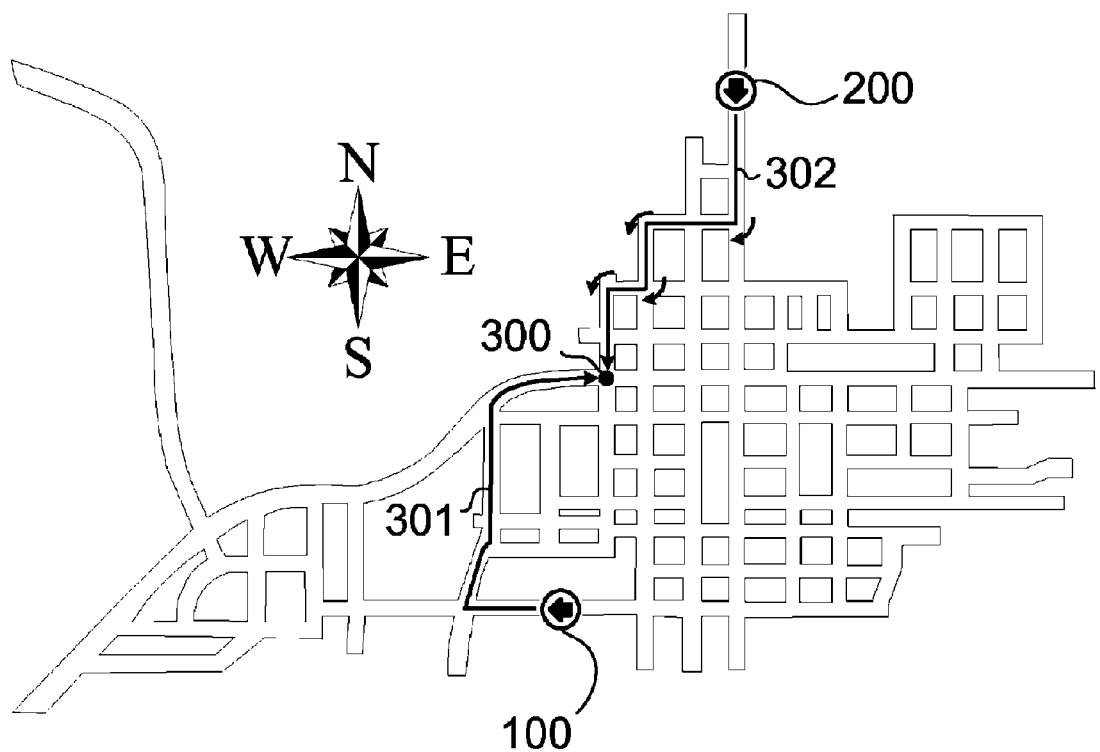
FIG. 4 depicts a rendezvous point and an intercept route in accordance with one illustrative embodiment of the present invention for providing turn-by-turn directions to a moving waypoint.

Referring now to FIG. 4, the position predicting module 213 computes the most probable future path 301 of the moving waypoint, a corresponding path 302 of the tracking second vehicle, and a rendezvous point 300 where these paths are coincident. A turn-by-turn direction generating module 223 then generates turn-by-turn directions to this rendezvous point. The turn-by-turn direction generating module 223 cooperates with the display 205 and/or another output device such as a speaker 206 to provide the turn-by-turn directions to the operator of the tracking second vehicle.

In certain embodiments of the present invention for determining the geographic position of the moving waypoint, the position determining system 201 is a cellular telephone network with its associated transmitters, receivers, relays, and antennas.

In further embodiments, the moving waypoint is the first vehicle that is cooperating with the first vehicle 100 to generate turn-by-turn directions applicable to the second vehicle 200 to a mutually agreed upon rendezvous point.

Figure 5:
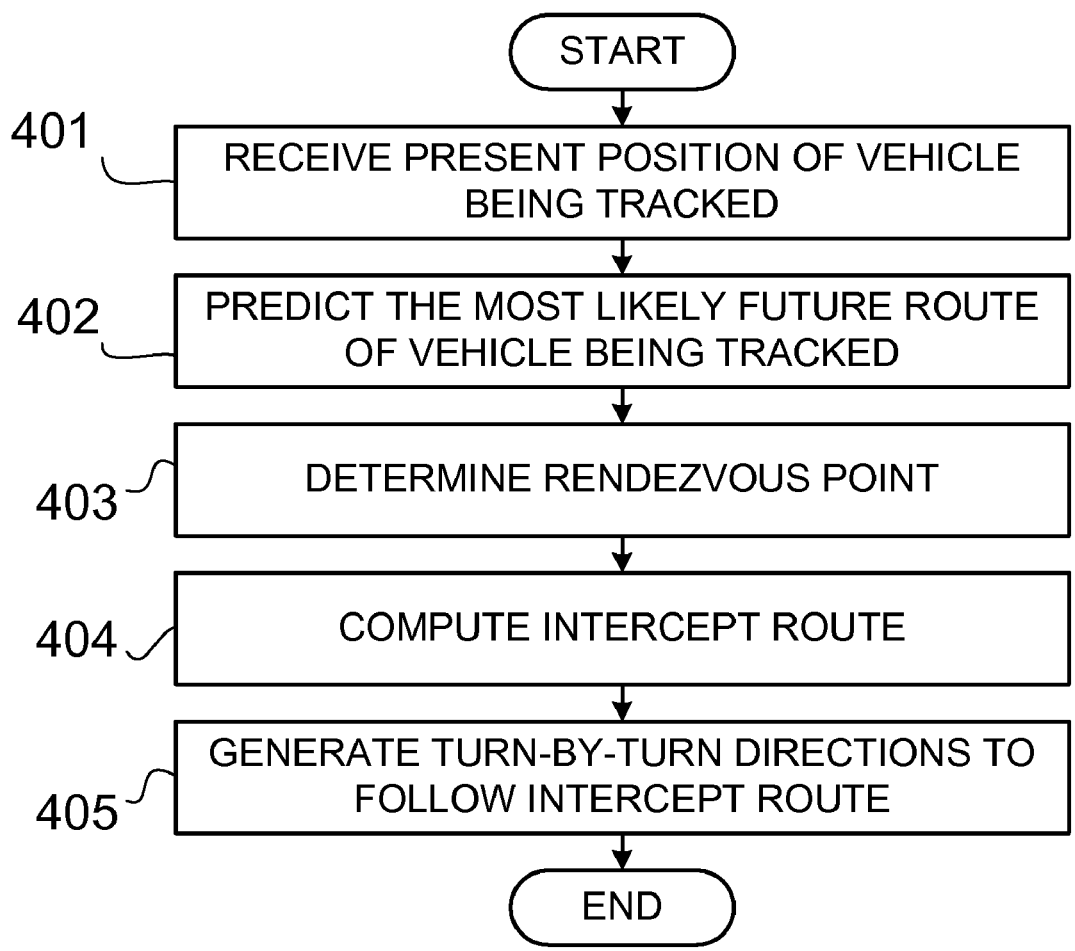
FIG. 5 is a flow chart illustrating one embodiment of a method for providing turn-by-turn directions to a moving waypoint.

Another embodiment of the present invention is the method depicted by the flowchart of FIG. 5. This method of rendezvousing a tracking vehicle 200 with a moving waypoint 100 considers that both the tracking vehicle and moving waypoint are both subject to the same constraints of the local road network 20, shown in FIG. 1.

First, the tracking vehicle 200 receives (step 401) the present position of the moving waypoint, such as the vehicle 100 that is being tracked. Next, the tracking vehicle 200 predicts (step 402) the most likely future route of the vehicle 100 being tracked, and determines (step 403) a rendezvous point. Finally, the tracking vehicle 200 computes (step 404) an intercept route and generates (step 405) turn-by-turn directions to follow this intercept route. In certain embodiments of the present invention, the rendezvous point can be selectively adjusted such that the vehicles 100, 200 will meet at place where they can safely stop, such as a shopping center parking lot or a highway rest stop.

It can be appreciated that it may also be desirable to track non-cooperative moving waypoints, such as stolen vehicles that are equipped with anti-theft tracking devices. Advantageously the present invention can compute the intercept route between the tracking vehicle 200 and the moving waypoint 100 such that the tracking vehicle 200 will approach and intercept the moving waypoint 100 at a selective target approach angle such as head-on. Other selective target approach angles can also be chosen, such as a right-angle approach from a side street at an intersection or from behind.

In further embodiments the pursuing tracking vehicle, such a police car is further equipped to relay its planned intercept route to traffic control systems, such as computers that control the timing of traffic lights. The traffic control system can further the movement of the pursuing tracking vehicle by strategically setting green lights along the intercept route and hinder the movement of the moving waypoint by strategically setting red lights along its most likely future route.

Even further embodiments of the present invention predict the most likely future speed profile of the moving waypoint as it travels through the local road network and also generate instructions on changing speeds in addition to generating turn-by-turn directions at the tracking second vehicle.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for providing turn-by-turn directions for rendezvousing with a moving waypoint comprising:
   a first position determining system for determining the present geographic position of the moving waypoint from a cellular telephone network and a transmitter configured to transmit the present geographic position of the moving waypoint;
   a tracking vehicle including a second position determining system for determining the present geographic position of the tracking vehicle from the cellular telephone network and a receiver configured to receive the present geographic position of the moving waypoint;
   wherein future movement of both the moving waypoint and the tracking vehicle are constrained by a local road network; and
   the tracking vehicle further includes
      a map database containing the defined movement constraints of the local road network,
      a position predicting module that applies the constraints of the local road network, the constraints comprising dead-end streets, one-way streets, speed limits, weather information, traffic accident information, traffic slow down information, and construction information to the present geographic position of the moving waypoint to generate a rendezvous point for the tracking vehicle and the moving waypoint and adjusts the rendezvous point to a safe stop, the safe stop selected from the group consisting of a parking lot and a rest stop, and
      a turn-by-turn direction generating module which generates turn-by-turn directions from the present position of the tracking vehicle to the adjusted rendezvous point.

2. The system of claim 1 wherein the transmitter configured to transmit the present geographic position of the waypoint and the receiver are both equipped with security provisions to preclude unauthorized eavesdropping.

3. The system of claim 2 wherein the security provisions comprise a shared digital code between the transmitter and receiver.

4. The system of claim 1 further comprising a network system adapted to receive the present geographic position of the moving waypoint and to transmit this received position to a plurality of receivers where this plurality of receivers includes the receiver of the tracking vehicle.

5. The system of claim 1 wherein the moving waypoint is a cooperating vehicle and the system further comprises:
   a transmitter in the tracking vehicle configured to transmit the adjusted rendezvous point to the cooperating vehicle; and
   a second turn-by-turn direction generating module which generates turn-by-turn directions from the present position of the cooperating vehicle to the adjusted rendezvous point.

6. A method for providing turn-by-turn directions for rendezvousing with a moving waypoint comprising:

receiving a transmitted present position of a moving waypoint at a tracking vehicle;

predicting a most likely future route of the moving waypoint, based on the moving waypoint's present position and movement constraints imposed by a local road network, wherein the transmitted present position is determined from a cellular telephone network;

determining a rendezvous point and computing an intercept route between a present position of the tracking vehicle and the moving waypoint, wherein the rendezvous point and intercept route are based on the most likely future route of the moving waypoint, the present position of the tracking vehicle, and the constraints of the local road network, the present position of the tracking vehicle is determined from the cellular telephone network, and the constraints of the local road system comprise dead-end streets, one-way streets, speed limits, weather information, traffic accident information, traffic slow down information, and construction information;

adjusting the rendezvous point to a safe stop, the safe stop selected from the group consisting of a parking lot and a rest stop;

generating turn-by-turn directions to follow the intercept route to the adjusted rendezvous point; and providing the turn-by-turn directions to an operator of the tracking vehicle.

7. The method of claim 6 wherein the step of computing the intercept route further computes this route such that the tracking vehicle intercepts the moving waypoint at the rendezvous point at a selective target approach angle.

8. The method of claim 6 wherein the selective target approach angle is selected from a group consisting of: a head-on approach, a right-angle approach at an intersection, and an approach from behind.

9. The method of claim 6 wherein the tracking vehicle is pursuing the moving waypoint and the intercept route is relayed to traffic control systems configured to use the intercept route to further the movement of the pursuing tracking vehicle and to hinder the movement of the pursued moving waypoint.

10. The method of claim 9 wherein the traffic control system furthers vehicle movement by strategically setting green lights along the intercept route and hinders vehicle movement by strategically setting red lights along the most likely future route of the moving waypoint.

11. A method for providing turn-by-turn directions for rendezvousing a first moving vehicle with a second moving vehicle comprising:

determining the geographic position and speed of the first moving vehicle from a cellular telephone network;

receiving a transmitted present geographic position and speed of the second moving vehicle, wherein the transmitted present geographic position and speed of the second moving vehicle is determined from the cellular telephone network;

determining a most likely future route of the second moving vehicle and the second vehicle's most likely future speed profile along that route, based on the second moving vehicle's transmitted present geographic position and present speed and the constraints of the local road network, the constraints of the local read network comprising dead-end streets, one-way streets, speed limits, weather information, traffic accident information, traffic slow clown information, and construction information;

computing an intercept route, an intercept speed plan, and a rendezvous point based on the most likely future route and most likely future speed profile of the second moving vehicle, the geographic position and speed of first vehicle, and the constraints of the local road network;

adjusting the rendezvous point to a safe stop, the sate stop selected from the group consisting of a parking lot and a rest stop;

generating turn-by-turn directions and instructions on changing speeds to follow the intercept route to the adjusted rendezvous point.

\* \* \* \* \*